United States Patent
Struck, II

(10) Patent No.: US 12,377,419 B2
(45) Date of Patent: Aug. 5, 2025

(54) VACUUM CYLINDER SHREDDER FOR LAWN DEBRIS

(71) Applicant: Eloy Struck, II, Gladwin, MI (US)

(72) Inventor: Eloy Struck, II, Gladwin, MI (US)

( * ) Notice: Subject to any disclaimer, the term of this patent is extended or adjusted under 35 U.S.C. 154(b) by 91 days.

(21) Appl. No.: 17/814,342

(22) Filed: Jul. 22, 2022

(65) Prior Publication Data
US 2023/0036759 A1    Feb. 2, 2023

Related U.S. Application Data

(60) Provisional application No. 63/226,218, filed on Jul. 28, 2021.

(51) Int. Cl.
*B02C 13/08* (2006.01)
*B02C 13/28* (2006.01)
*B02C 13/286* (2006.01)

(52) U.S. Cl.
CPC ............ *B02C 13/08* (2013.01); *B02C 13/286* (2013.01); *B02C 2013/2816* (2013.01); *B02C 2013/28618* (2013.01)

(58) Field of Classification Search
CPC .............. B02C 13/08; B02C 13/286; B02C 2016/2816; B02C 2016/28618; B02C 21/00; B02C 21/02; B02C 2021/023; B02C 18/14; B02C 2201/066; A01G 20/43; A01G 20/47; A01G 3/002; B27L 11/02; B27L 11/04; B27L 11/06; B27L 11/08
USPC ......................................................... 241/21
See application file for complete search history.

(56) References Cited

U.S. PATENT DOCUMENTS

| | | | | |
|---|---|---|---|---|
| 2,840,972 | A * | 7/1958 | Schwarz | A01G 20/43 241/101.78 |
| 3,860,181 | A | 1/1975 | Enters et al. | |
| 4,173,351 | A * | 11/1979 | Hetland | B62B 15/007 280/18 |
| 4,422,578 | A | 12/1983 | Scott | |
| 5,020,309 | A * | 6/1991 | Hopkins | A01D 42/005 241/292.1 |
| 5,267,697 | A * | 12/1993 | Holecz | B02C 18/16 241/285.2 |
| 6,014,794 | A * | 1/2000 | Mc Coy | B62J 7/08 24/68 CD |
| 7,431,231 | B1 | 10/2008 | Saiki | |
| 7,520,546 | B2 * | 4/2009 | Monahan | A01G 20/43 15/257.1 |
| 10,555,458 | B2 * | 2/2020 | Takla | A01G 3/002 |
| 10,631,467 | B1 * | 4/2020 | Burnett | B02C 7/08 |
| 2015/0027096 | A1 | 1/2015 | Black et al. | |
| 2018/0214886 | A1 * | 8/2018 | Holcomb | B02C 18/06 |
| 2021/0051858 | A1 * | 2/2021 | Struck, II | A01G 3/002 |

FOREIGN PATENT DOCUMENTS

NL    1030595 C2 *    6/2007    ............... A01G 3/08

OTHER PUBLICATIONS

Machine translation of NL-1030595-C2 (Year: 2007).*

* cited by examiner

*Primary Examiner* — Christopher L Templeton
*Assistant Examiner* — Teresa A Guthrie

(57) ABSTRACT

A vacuum cylinder shredder for lawn debris using at least one string trimmer assembly and a collection mat.

16 Claims, 4 Drawing Sheets

VACUUM CYLINDER SHREDDER FOR LAWN DEBRIS

CROSS-REFERENCE TO RELATED APPLICATIONS

Not Applicable.

STATEMENT REGARDING FEDERALLY SPONSORED RESEARCH OR DEVELOPMENT

Not Applicable

REFERENCE TO SEQUENCE LISTING, A TABLE, COMPUTER PROGRAM OR A LISTING COMPACT DISC APPENDIX

Not Applicable

BACKGROUND OF THE INVENTION

The applicant is aware of several patent publications that describe shredding machines. For example, U.S. Pat. No. 3,860,181 that issued Jan. 14, 1975, to Enters, et al., deals with a device that utilizes a plurality of shredding or beater blades to provide a debris recirculation zone above a cutting blade. The device is housed in a mobile unit.

U.S. Pat. No. 4,422,578 that issued Dec. 27, 1983, to Scott deals with a rotary grain mill but is not generally directed to shredding lawn debris and is consequently not configured to shred lawn debris.

U.S. Pat. No. 7,431,231 that issued Oct. 7, 2008, to Saiki deals with a shredder for comminuting organic material. This device deals with a cutter blade and not trimmer lines.

U.S. Patent publication 2015/0027096 deals with a plant trimming apparatus using a cutting blade in conjunction with a plurality of grates opening to cut plants.

U.S. Pat. No. 10,631,467, that issued on Apr. 28, 2020, to Burnett et al deals with a rotary plant cutter and requires a first disk which is stationary and a second disk that is rotary for cutting plants and debris. The first and second disks are solid materials and not string trimmer material.

BRIEF SUMMARY OF THE INVENTION

The invention disclosed herein deals with a vacuum cylinder shredder for lawn debris using at least one string trimmer assembly and a collection mat. The vacuum cylinder shredder for lawn debris comprises a first collection mat wherein the first collection mat has two side edges, a front-end and a back end.

The first collection mat has mounted on a top at the back end, a shredder, the shredder being comprised of a cylindrical hollow tube having a diameter of 18 inches to 36 Inches and a length of 12 inches to 36 inches. The cylindrical hollow tube has a frame detachedly mounted in it. The cylindrical hollow tube has associated with it at least one tie-down. The frame has mounted on it an electrically driven motor having a drivable shaft and the drivable shaft has mounted on it at least one string trimmer.

In a second embodiment there is a vacuum cylinder shredder for lawn debris, the vacuum cylinder shredder comprises in combination a first collection mat wherein the first collection mat has two side edges, a front end and a back end. The back end of the first collection mat has a connecting strip that attaches the back end of the first mat to an overlap material. There is a plurality of fasteners for fastening the overlap material over the cylindrical hollow tube.

The first collection mat has mounted at the back end, a shredder, the shredder is comprised of a cylindrical hollow tube having a diameter of 18 inches to 36 inches and a length of 12 inches to 36 inches.

The cylindrical hollow tube has a frame detachedly mounted in it. The frame has mounted on it an electrically driven motor having a drivable shaft wherein the drivable shaft has mounted on it at least one string trimmer.

DETAILED DESCRIPTION OF THE DRAWINGS AND INVENTION

Figure 2:
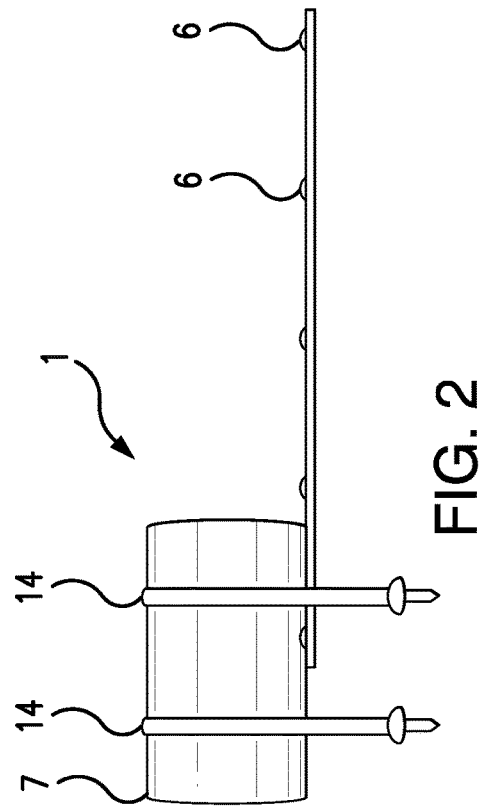
FIG. 2 is a full side view of the device of FIG. 1.
Figure 1:
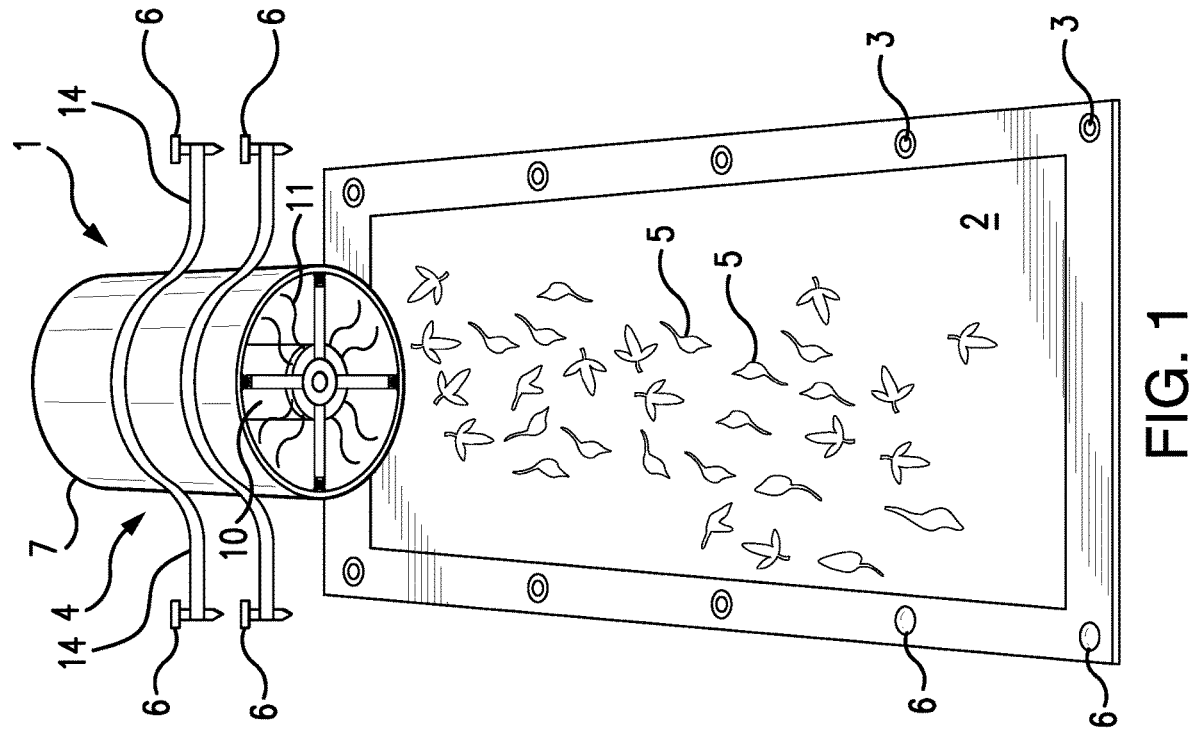
FIG. 1 is a full top view in perspective of the device of this invention.

Turning now to FIG. 1 there is shown a full top perspective view of the device 1 of this invention. There is shown the collection mat 2, which has grommets 3 for pegging the mat 2 to a soft surface such as grass or dirt using pegs 6 as shown in FIG. 1 and FIG. 2.

Figure 4:
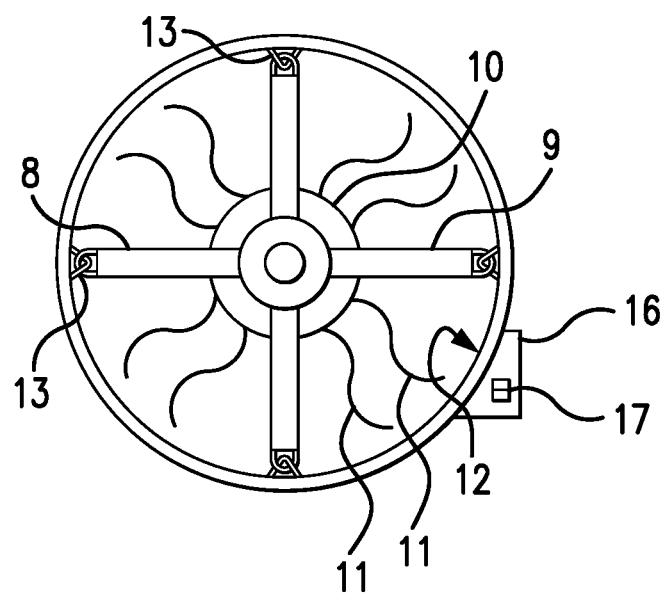
FIG. 4 is a full front-end view of the cylinder showing the support assembly and two motors with trim lines.

Setting at one end of the mat 2 is a vacuum cylinder shredder 4 useful for shredding lawn debris 5, and the like. The vacuum cylinder shredder 4 is established at one end of the collection mat 2. It is configured to lay just over the edge of the mat 2 and lays essentially on the surface that the mat 2 is laid on. With reference to FIG. 4, there is shown a full front-end view of a cylinder 7 having support members 8 and 9 attached therein.

Shown in FIG. 4 is the cylinder 7, the support bars 8 and 9, and a motor 10. Attached to the motor 10 are two sets of line trimmer material 11 although it is contemplated within the scope of this invention to use only one such set of line trimmer material 11.

The support members 8 and 9 are attached to the inside wall 12 of the cylinder so as to make the cross bars 8 and 9 unmovable against the torque created by the revolving of the motor shaft and trimmer lines 11.

Figure 3:
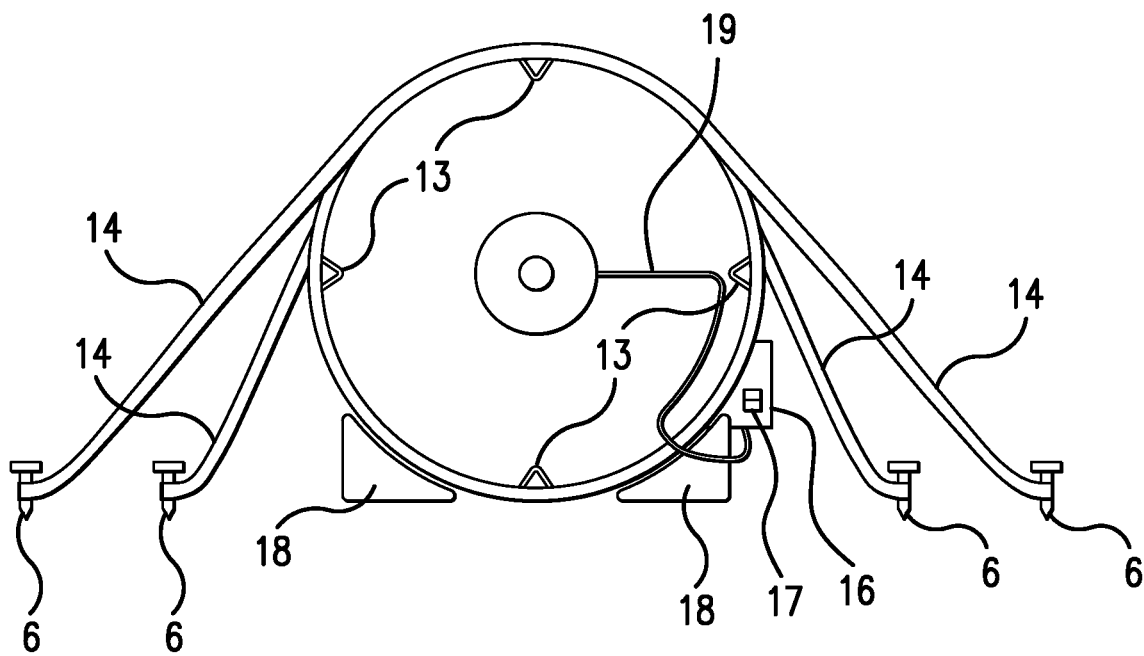
FIG. 3 is a back-end view of the device of FIG. 1 without the support assembly or motor.

Shown in FIG. 3 is a full back view of the cylinder 7 showing the use of chocks 18 to prevent the cylinder 7 from rolling or moving due to the torque of the motor, or from wind. Shown are the attachments 13 for the support members 8 and 9, along with tie downs 14 and the stakes 6 that are holding the tie downs 14.

The device 1 is used by staking down the mat 2, setting the device 1 on the mat 2, and using tie downs 14 to secure the cylinder 7 in place. Leaves or debris are collected on the mat 2 and then fed to the cylinder 7 while the motor 10 is operating.

FIG. 3 shows a box 16 located on the outside of the cylinder 7. This box 16 contains a battery for energizing the motor 10 and a control switch 17 for controlling the on and off of the motor. Included is the electrical wiring 19 running from the box 16 to the motor 10. It is contemplated within the scope of this invention to use chocks 18 to stabilize the cylinder 7.

The mat 4 can be manufactured from paper, cardboard, plastic, fabric, mesh, tarp material and the like. The cylinder 7 can be manufactured from cardboard, plastic, wood, or metal, plastic being preferred to allow portability of the equipment.

Trimmers noted here are standard trimmers, that is string trimmers, also called a weed eater, weed whacker, weed whip, line trimmer, brush cutter, whipper snipper or just strimmer and it is a garden tool for cutting grass, small weeds, and groundcover. It uses a whirling monofilament line instead of a blade, which protrudes from a rotating spindle at the end of a shaft topped by a motor. Thus, this invention has the advantage of being highly portable without the use of machinery and less costly because metal blades are not required or used in this invention. The stabilization of the cylinder 7 is accomplished by strapping it down to the surface that the mat 4 is laying on or by the overlaid material as shown in this invention. The stabilization can be achieved by using wire, rope, bungee cords (sometimes spelled "bungie" or "shock cord"). This is an elastic cord composed of one or more elastic strands forming a core, usually covered in or a woven cotton polypropylene sheath.

The diameter of the cylinder 7 can be in the range of about 14 inches to about 24 inches for best performance. It should have a wall thickness of at least 14 inch so as to be stable. Usually, the total weight of the cylinder should approximate 8 to 12 pounds in order to stay stable at the greater rpm's.

The fasteners 13 are disconnectable so that the support members 8 and 9, the motor 10, and the trimmer assembly can be easily removed from the cylinder 7 for transport or storage.

Chocks 18 may not be necessary but can be useful if there are high winds or the cylinder 7 is manufactured from lightweight material. In order to be a good shredder, it is recommended that the motor 10 run in excess of about 7000 rpm's or greater (8000 rpm's is recommended). It is the rotation of the trimmer that creates a vacuum in the shredder and causes the forward movement of the debris through the shredder. The end result is that the shredded debris is pushed out the back of the cylinder 7 to be collected.

In an alternate embodiment, it is contemplated that the shredder 1 assembly be composed of three parts, the mat 4, the shredder 1 and a fold over material 20 for folding over the cylinder 7 so that bungee cords or the like do not have to be used. See FIGS. 5 and 6.

Figure 5:
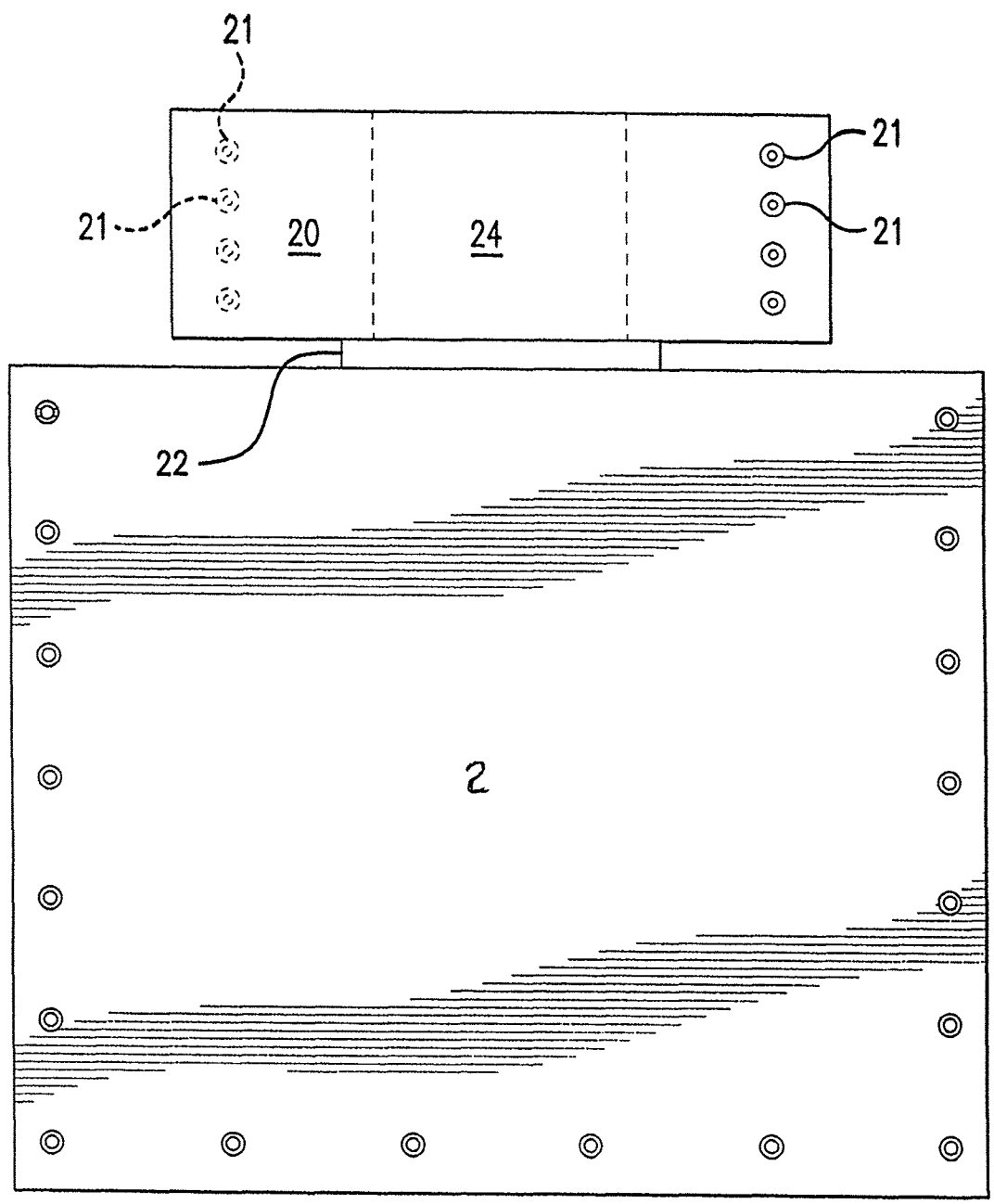
FIG. 5 shows a top view of a two-piece mat assembly.
Figure 6:
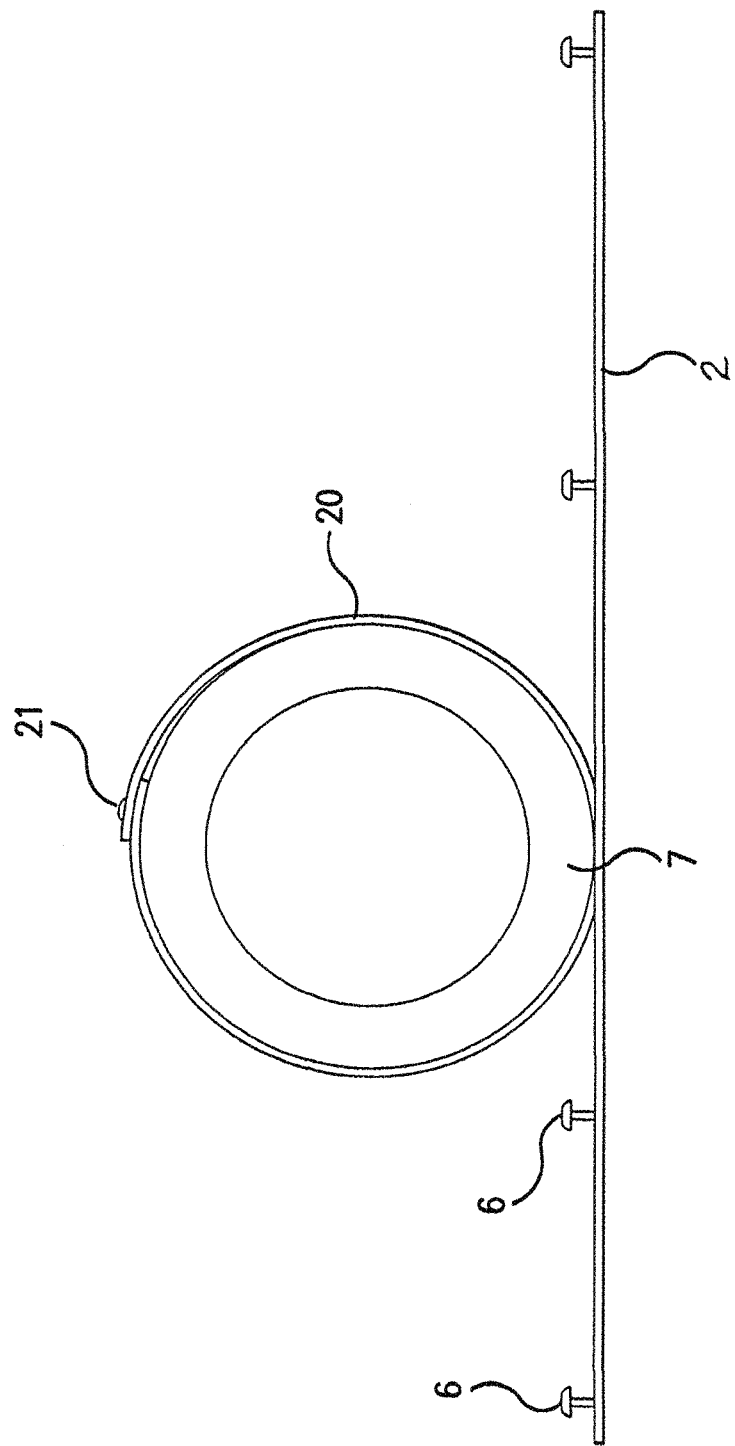
FIG. 6 shows an end view of the mat assembly of FIG. 5.

Referring now to FIG. 5 there is shown a mat 4 and a fold over material 20 that are attached by strip 22. The mat 4 can be the same as the mat for the first technology mentioned Supra. The fold over material 20 is shown with attachments 21, such as snaps, although alternate means of attaching the two ends of the fold over material 20 can be used. The designation 24 in FIG. 5 shows the general area wherein the cylinder 7 would lay. FIG. 6 shows the fold over material 20 in use in that it shows the material being folded over the cylinder 7 and fastened in place. Because of the strip 22 attachment, the cylinder 7 is held in place.

What is claimed is:

1. A vacuum cylinder shredder for lawn debris, said vacuum cylinder shredder comprising in combination:
    a first collection mat, said first collection mat having two side edges, a front end and a back end;
    said first collection mat having mounted on a top thereof, at said back end, a shredder, said shredder being comprised of:
    a cylindrical hollow tube having a diameter of 18 inches to 36 inches and a length of 12 inches to 36 inches;
    said cylindrical hollow tube having a frame detachedly mounted therein;
    said cylindrical hollow tube having associated therewith at least one tie-down, wherein said at least one tie-down are elastic cords;
    said frame having mounted thereon an electrically driven motor having a drivable shaft;
    said drivable shaft having mounted thereon at least one string trimmer.

2. The vacuum cylinder shredder as claimed in claim 1 wherein the at least one string trimmer comprises two string trimmers mounted on said drivable shaft.

3. The vacuum cylinder shredder as claimed in claim 1 further comprising securing stakes for securing said first collection mat to an earthen surface.

4. The vacuum cylinder shredder as claimed in claim 1 wherein the tie-down cords are Bungee cords.

5. The vacuum cylinder shredder as claimed in claim 1 wherein said cylindrical hollow tube is manufactured from cardboard.

6. The vacuum cylinder shredder as claimed in claim 1 wherein said cylindrical hollow tube is manufactured from metal.

7. The vacuum cylinder shredder as claimed in claim 6 wherein said metal is aluminum.

8. The vacuum cylinder shredder as claimed in claim 1 wherein said cylindrical hollow tube is manufactured from plastic.

9. The vacuum cylinder shredder as claimed in claim 8 wherein said plastic is recycled plastic.

10. The vacuum cylinder shredder as claimed in claim 1 wherein said first collection mat is manufactured from fabric.

11. The vacuum cylinder shredder as claimed in claim 1 wherein said first collection mat is manufactured from plastic.

12. The vacuum cylinder shredder as claimed in claim 1 wherein said first collection mat is manufactured from a tarp.

13. The vacuum cylinder shredder as claimed in claim 1 wherein said motor is battery driven.

14. The vacuum cylinder shredder as claimed in claim 1 wherein said cylindrical hollow tube weighs at least 8 pounds absent a mounting frame, motor, and string trimmer.

15. The vacuum cylinder shredder as claimed in claim 1 further comprising chocks against said cylindrical hollow tube to prevent said cylindrical hollow tube from rolling.

16. A vacuum cylinder shredder for lawn debris, said vacuum cylinder shredder comprising in combination:
    a first collection mat, said first collection mat having two side edges, a front end and a back end;
    said back end of said first collection mat having a connecting strip that directly attaches the back end of said first mat to an overlap material;
    a plurality of fasteners for fastening said overlap material over a cylindrical hollow tube, wherein said cylindrical hollow tube is held in place by the overlap material and the connecting strip;
    said first collection mat having mounted at said back end, a shredder, said shredder being comprised of:
    the cylindrical hollow tube having a diameter of 18 inches to 36 inches and a length of 12 inches to 36 inches;
    said cylindrical hollow tube having a frame detachedly mounted therein;
    said frame having mounted thereon an electrically driven motor having a drivable shaft;

said drivable shaft having mounted thereon at least one string trimmer.

\* \* \* \* \*